United States Patent Office 3,300,450
Patented Jan. 24, 1967

3,300,450
STABILIZED AROMATIC POLYAMIDE
FILAMENTS
William R. Clay, Newark, Del., assignor to E. I. du Pont
de Nemours and Company, Inc., Wilmington, Del., a
corporation of Delaware
No Drawing. Continuation of application Ser. No.
149,518, Nov. 2, 1961. This application Apr. 12,
1966, Ser. No. 541,977
4 Claims. (Cl. 260—78)

This application is a continuation of United States Serial No. 149,518, filed November 2, 1961, now abandoned.

This invention relates to an improvement in filamentary products formed of wholly aromatic polyamides, including yarn, woven or knitted fabric, and non-woven fabric of textile filaments, fibers, fibrids, or blends thereof. The invention is more particularly concerned with improving the stability of such products against deterioration at elevated temperature, and especially of such products composed in whole or in part of poly(metaphenylene isophthalamide).

As disclosed in British Patent No. 871,581, issued to the assignee of the present invention and having a publication date of June 28, 1961, the wholly aromatic polyamides are a new class of synthetic polymers having a valuable combination of properties. They are characterized by being made up of the structural unit

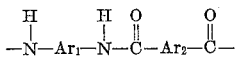

wherein $Ar_1$ and $Ar_2$ and the same or different and are substituted or unsubstituted divalent aromatic radicals in which the chain extending bonds are not ortho oriented with respect to each other or to bonds linking one aromatic ring directly or through a linking group to another aromatic ring. A wide variety of substituents may be present on the aromatic rings, such as alkyl, alkoxy, carbalkoxy, nitro and halogen substituents of up to 5 carbon atoms each, where the total number of carbon atoms in substituent groups attached to any one aromatic ring does not exceed nine carbon atoms.

The disclosure of the British patent is relied upon for the preparation and properties of representative members of this class of wholly aromatic polyamides. As disclosed therein, they can be shaped into fibers, films and other structures which have outstanding properties in comparison with those of previous commercial polymeric structures such as poly(hexamethylene adipamide), poly (ethylene terephthalate) and polyethylene. They have unusually high melting points in excess of 300° C., have excellent physical properties at room temperature, and retain high tenacity, good work recovery and high flex life upon exposure to elevated temperatures. They have high resistance to thermal degradation, with substantially no flammability, and are generally inert to corrosive and degrading atmospheric conditions. However, it has been found in tests of fabrics and papers, made from these wholly aromatic polyamides, that undesirable embrittlement occurred as a result of extended exposure to elevated temperatures.

It is an object of this invention to provide filamentary products of improved stability, which retain a greater proportion of desirable physical properties during and after extended exposure to elevated temperatures. Other objects of the invention will become apparent from the specification and claims.

Because of the high melting point of the wholly aromatic polyamides, these polymers cannot be melt spun. In general, they are not soluble in common solvents. They can be spun from solvent solutions prepared as specified in the above British patent. Suitable spinning solutions of the polyamide are prepared directly from the polymer intermediates in the solvent without isolating the polymer from the reaction medium and redissolving it. The aromatic diamine, e.g., meta-phenylenediamine, is reacted with the aromatic di-acid chloride, e.g., isophthaloyl chloride, in a solvent for the polyamide produced. The reaction produces hydrogen chloride, and an acid acceptor or neutralizer, e.g., calcium hydroxide, is required to stabilize the resulting solution of polyamide. Any insoluble material is separated and shaped structures are then produced from the solution by known methods, such as dry or wet spinning, film-casting or coating a substrate, with evaporation or extraction of the solvent from the shaped structure, as disclosed in the British patent.

Alternatively, the wholly aromatic polyamide can be isolated from the reaction medium in substantially pure form and then dissolved in a suitable solvent to form the spinning solution as disclosed in the British patent. A stable spinning solution usually requires the presence in solution of at least 3% of chloride or bromide salt based on the total weight of the solution. When using substantially pure polyamide, so that the solution would contain less than this amount of chloride or bromide salt, the solution is stabilized by suitable addition of chloride or bromide. For solutions prepared with an amine solvent, hydrogen chloride or hydrogen bromide can be added to form a chloride or bromide salt of the amine. With other solvents the chloride or bromide can be added as an inorganic salt, such as an alkali or alkaline earth metal chloride or bromide which has at least the requisite solubility in the solvent selected. When the spinning solution is prepared directly from the polymer intermediates without isolating the polyamide, an excess of chloride or bromide can be removed as disclosed in the British patent, but at least 3% of chloride or bromide salt is left to stabilize the solution. It has been found that iodide salts are much less effective and have little or no practical utility in promoting solution stability. Fluoride salts are generally insoluble, but probably would be very effective if a practical means were found to achieve the required concentration of the fluoride ion.

In previous processes for spinning these solutions by either dry or wet methods, a seemingly insignificant amount of chloride has remained in the shaped polyamide even after washing to remove residual solvent. For example, I have found that poly(meta-phenylene isophthalamide) fibers and yarn analyzed 0.5 to 0.7% chlorine as residual chloride, when prepared from a stable spinning solution of the polymer in dimethylacetamide containing about 3% calcium chloride, by dry spinning and subsequently washing, drawing and drying. Several cycles of washing in boiling water and drying in 150° C. air did not reduce the residual chlorine content below 0.4%. Extraction with boiling dimethylformamide was likewise ineffective for removing the salt.

In accordance with the present invention I have found that extraction to substantially eliminate residual chloride or bromide salt from such shaped structures of wholly aromatic polyamides results in a surprising improvement in retention of desirable physical properties after prolonged exposure to high temperatures. Poly-(meta-phenylene isophthalamide) yarn analyzing less than 0.0028 gm.-atom chlorine or bromine per 100 gms. which had been heated at 250° C. for 500 hours has been found to have remarkably stable properties in comparison to those of similarly aged yarn which differed only in analyzing 0.017 gm.-atom chlorine or bromine per 100 gms. The tenacity after aging for the yarn of this invention was about 3 times that of yarn containing 0.017 gm.- atom chlorine or bromine as residual chloride or bromide and the toughness was at least 25 times as great in the "work-to-break" test referred to subsequently. This effect of residual halide salt on resistance to high temperature aging is highly unexpected.

In accordance with this invention I have also found that residual chloride or bromide salt in the wholly aromatic polyamide can be reduced to less than 0.0028 gm.-atom per 100 gms. of fiber, analyzed as chlorine or bromine, by special extraction of the shaped products. As indicated, the halide salt is not removed in normal processing of yarn, and is not removed by simple washing with water or 100% dimethylformamide. I have found that the halogen content can be reduced to less than 0.0028 gm.-atom per 100 gms. of fiber by extraction with a boiling solution of equal parts of water and dimethylformamide. Exhaustive extraction with a flowing stream of deionized water at temperatures approaching the boiling point will also provide less than 0.0028 gm.-atom residual halogen per 100 gms. of fiber.

The following examples, in which percentages are by weight, illustrate specific embodiments of the invention and improvements in properties achieved:

Example I

Poly(meta-phenylene isophthalamide) was dry spun into 200 denier, 100 filament yarn from a dimethylacetamide spinning solution containing about 20% of the polyamide and about 3% calcium chloride (prepared as disclosed in British Patent No. 871,581, of June 28, 1961). After washing, drawing and drying the yarn was found to contain 0.0178 gm.-atom chlorine as chloride salt per 100 gms. One portion of the yarn was extracted with boiling 50% aqueous solution of dimethylformamide until it contained 0.0017 gm.-atom chlorine as chloride salt per 100 gms. Samples of each portion of the yarn were tested at 21° C. for tenacity, break elongation and toughness after aging for various times at 250° C., and samples were similarly tested for tenacity and elongation at 250° C. after various aging times. Toughness was evaluated by a comparison of the area under the stress-strain curve in a "work-to-break" test. The results are given in the following table. The tenacity and break elongation of samples containing the smaller amount of chlorine remained relatively constant even after 516 hours at 250° C., whereas the tenacity and break elongation of samples containing the larger amount of chlorine decreased rapidly with aging. A comparison of the toughness values of the two portions of yarn shows an even more striking improvement.

(70/30), embrittled after six days when exposed to heat-aging at 250° C. In contrast, a like structure wherein the yarn contained 0.0028 gm.-atom chlorine per 100 gms. was aged up to sixty days at 250° C. without showing any sign of embrittlement. Embrittlement was measured by the mandrel test, a standard test in the electrical industry used to determine acceptability of materials after heat-aging, which involves bending the sample 180° around a ½-inch diameter mandrel and then checking for cracks. If cracks appear the sample is considered embrittled; otherwise, it is not.

Example III

Paper of 0.007 inch thickness prepared, as described in U.S. Patent No. 2,999,788, dated September 12, 1961, to Paul W. Morgan, from a mixture of about 50% fiber flock of about ¼-inch length and 50% of fibrids both of poly(meta-phenylene isophthalamide) with a salt content of about 0.0025 gm.-atom chlorine per 100 gms. was densified by heat (500° F.) and pressure (1,000 lbs./sq. in.) for one minute to develop optimum properties and was then subjected to heat-aging tests for various lengths of time up to 1,000 hours at 250° C. Even after 1,000 hours heat-aging the samples could be bent 180° around a ½-inch mandrel without cracking. The 1,000 hour heat-aged paper retained 78% of original dielectric strength and its tensile strength and basis weight remained substantially unchanged.

In contrast, papers of the same composition except for a high salt content (0.014 gm.-atom chlorine per 100 gms.) and prepared under these same conditions to give acceptable papers, cracked when bent 180° around a ½-inch mandrel even without being subjected to any heat-aging test.

Example IV

Yarn samples similar to the yarn of Example I but containing initially 0.017 gm.-atom chlorine per 100 gms. were subjected to repeated cycles of washing in boiling water followed by exposure to hot dry air at 150° C. with the following results:

| Sample | Number of Wash-Dry Cycles | Gm.-Atoms Chlorine per 100 Gms. Yarn |
|---|---|---|
| A | None | 0.017 |
| B | 2 | 0.014 |
| C | 4 | 0.014 |
| D | 7 | 0.0135 |
| E | 10 | 0.012 |

TABLE.—EFFECT OF CHLORIDE CONTENT ON YARN AGED AT 250°C.

| Gm.-atoms of Chlorine/100 gms. | Aging Time at 250° C. (hours) | Tenacity Measured at 21° C. (gm./den.) | Elong. Meas. at 21° C. (percent) | Toughness at 21° C. (inch-gms. per inch) | Tenacity at 250° C. (gm./den.) | Elong. at 250° C. (percent) |
|---|---|---|---|---|---|---|
| .0178 | 0 | 5.58 | 14.9 | 136 | 2.82 | 11.3 |
| .0178 | 92 | 3.64 | 6.1 | 22.4 | 3.56 | 8.0 |
| .0178 | 188 | 3.14 | 4.5 | 19.1 | 2.91 | 6.0 |
| .0178 | 301 | 2.85 | 3.6 | 14.1 | 2.62 | 5.2 |
| .0178 | 420 | 2.42 | 2.7 | 8.9 | 2.63 | 5.4 |
| .0178 | 516 | 1.86 | 1.5 | 3.2 | 2.05 | 3.4 |
| .0017 | 0 | 5.19 | 17.6 | 155 | 3.57 | 13.8 |
| .0017 | 92 | 4.86 | 17.4 | 147 | 3.05 | 12.8 |
| .0017 | 188 | 4.91 | 15.7 | 125 | 3.40 | 13.6 |
| .0017 | 301 | 4.94 | 15.2 | 124 | 3.62 | 13.2 |
| .0017 | 420 | 5.03 | 15.1 | 123 | 3.50 | 15.8 |
| .0017 | 516 | 4.57 | 13.1 | 98.1 | 3.20 | 13.2 |

Example II

Coated fabrics of 0.010 inch thickness prepared from poly(meta-phenylene isophthalamide) yarn containing 0.014 gm.-atom chlorine per 100 gms., and coated with a salt-free varnish to leave a polymer coating thereon of poly(meta - phenylene isophthalamide/terephthalamide)

Although this test indicates the removal of all but trace amounts of halides may not be accomplished easily, it was found practical to provide wholly aromatic polyamide products containing no more than 0.0028 gm.-atom halide per 100 gms. by extraction with a flowing stream of hot deionized water. Since it is difficult to remove appreciable amounts of salt after drawing with attendant consolidation of the structure, washing is generally carried out prior to any substantial amount of drawing. Preferably, this washing-drawing process for yarns involves counter-current flow of high temperature deionized water through a number of wash tanks in series together wtih rolls submerged in the liquor within the tanks and above the tanks to impose step-wise draw and relaxation on the yarns as they are passed therethrough, the rate of liquor flow being so regulated as to produce an effluent stream containing approximately 20% of polymer solvent. Fibrids referred to in Example III can also be prepared with no more than 0.0028 gm.-atom chlorine per 100 gms. by washing counter-currently with deionized water by means of a series of rotary vacuum filters and slurry tanks.

*Example V*

Poly(meta-phenylene isophthalamide) 200 denier, 100 filament yarn containing about 0.01 gm.-atom of bromine as bromide salt per 100 grams of yarn is prepared as in Example I, but using a dimethylacetamide spinning solution of polyamide prepared from isophthaloyl bromide, instead of chloride, and stabilized with 5.5% calcium bromide, instead of the 3% calcium chloride of the previous example. Comparative tests of this yarn and a portion which has been extracted with boiling 50% aqueous solution of dimethylformamide to contain only 0.0016 gm.-atom of bromine, as bromide salt per 100 grams, show the same striking improvement as in the tests of Example I to result from the lower halogen content.

Although the invention has been specifically illustrated only with poly(meta-phenylene phthalamides) it is applicable to all wholly aromatic polyamides such as those disclosed in British Patent No. 871,581. These more thermally stable products capable of withstanding high operating temperatures for extended lengths of time are of major interest to many types of industry. The future trend is definitely toward smaller and lighter equipment that will be required to withstand higher temperatures and perform an equivalent or greater amount of work, which will place more strenuous requirements on existing materials of construction. The military and the electrical industries are actively searching for new and better high temperature materials. The added thermal stability and the improved high temperature properties of the materials of this invention will permit its use in many applications which could not be made at all with existing fiber materials; goal specifications exist for such uses as 600° F. jet engine starter hose, military parachutes and flight clothing, and high speed aircraft tires which have not been attainable with present fibrous structures. It has been demonstrated that the low salt yarns of this invention will fulfill these requirements.

Since many different embodiments of the invention may be made without departing from the spirit and scope thereof, it is to be understood that the invention is not limited by the specific illustrations except to the extent defined in the following claims.

What is claimed is:

1. The process for improving the stability against deterioration at elevated temperatures of filamentary products of wholly aromatic carbocyclic polyamides containing in excess of 0.014 gm.-atom of a member selected from the group consisting of Cl and Br as salt per 100 gms. of the polyamide which comprises reducing the salt content of the filamentary wholly aromatic carbocyclic polyamide to less than 0.0028 gm.-atom of the halogen per 100 gms. by extraction with a hot liquid selected from the group consisting of deionized water and a mixture of substantially equal parts of dimethylformamide and water.

2. A process as defined in claim 1 wherein the wholly aromatic polyamide is poly(meta-phenylene isophthalamide).

3. Filamentary products of a wholly aromatic polyamide characterized by the recurring structural unit,

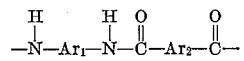

wherein $Ar_1$ and $Ar_2$ are divalent aromatic carbocyclic rings in which the chain extending bonds, connecting $Ar_1$ and $Ar_2$ to nitrogen atoms and carboxy groups, respectively, are attached to non-adjacent carbon atoms in the said aromatic rings, said polymer having an inherent viscosity of at least 0.6 in concentrated sulfuric acid at 30° C. at a concentration of 0.5% by weight, said filamentary wholly aromatic carbocyclic polyamide containing a member selected from the group consisting of residual chloride salt and residual bromide salt from the preparation of the said polyamide in an amount of from a trace to no more than 0.0028 gm.-atom of the halogen per 100 grams of the polyamide.

4. Filamentary products composed essentially of poly-(meta-phenylene isophthalamide) containing a member selected from the group consisting of residual chloride salt and residual bromide salt from the preparation of the said poly(meta-phenylene isophthalamide) in an amount of from a trace to no more than 0.0028 gm.-atom of a member selected from the group consisting of Cl and Br as residual salt per 100 grams of product.

References Cited by the Examiner

UNITED STATES PATENTS

| | | | |
|---|---|---|---|
| 2,244,192 | 6/1941 | Flory | 260—78 |
| 2,359,877 | 10/1944 | Schupp | 260—78 |
| 2,766,222 | 10/1956 | Lum et al. | 260—78 |
| 3,063,966 | 11/1962 | Kwolek et al. | 260—78 |

WILLIAM H. SHORT, *Primary Examiner.*

H. D. ANDERSON, *Assistant Examiner.*